United States Patent [19]

Krage et al.

[11] 4,384,480
[45] May 24, 1983

[54] METHOD AND APPARATUS FOR ACCURATELY LOCATING PISTON TOP DEAD CENTER POSITION BY A MICROWAVE ENERGY TECHNIQUE

[75] Inventors: Mark K. Krage, Royal Oak; John H. Lienesch, Bloomfield Hills; Robert M. Storwick, Rochester, all of Mich.

[73] Assignee: General Motors Corporation, Detroit, Mich.

[21] Appl. No.: 228,313

[22] Filed: Jan. 26, 1981

Related U.S. Application Data

[63] Continuation-in-part of Ser. No. 121,469, Feb. 14, 1980, abandoned.

[51] Int. Cl.³ .................... G01M 15/00; F02P 17/00
[52] U.S. Cl. .................................... 73/116; 73/117.3; 324/391; 364/551
[58] Field of Search ................... 73/116, 117.3, 35; 364/551, 728; 324/58.5 C, 391, 392

[56] References Cited

U.S. PATENT DOCUMENTS

| | | | |
|---|---|---|---|
| 3,589,177 | 6/1971 | Merlo | 73/116 |
| 3,703,825 | 11/1972 | Merlo | 73/116 |
| 4,331,029 | 5/1982 | Wilson | 73/117.3 |

OTHER PUBLICATIONS

"Combustion Chamber Investigations by Means of Microwave Resonances", Merlo, *IEEE Transactions,* v. IECI-17 n. 2, Apr. 1970, pp. 60-66.

*Primary Examiner*—Howard A. Birmiel
*Attorney, Agent, or Firm*—C. R. Meland

[57] ABSTRACT

While the crankshaft of an internal combustion engine is rotating, an encoder device produces a reference signal pulse and a series of encoder signal pulses during each crankshaft revolution and a microwave signal of a substantially constant amplitude and frequency is coupled through a microwave probe into the combustion chamber of a selected reference cylinder of the engine. The microwave signal waveform reflected from the reference cylinder combustion chamber while the reference cylinder piston approaches, passes through and moves away from the top dead center position during the compression and power strokes is processed to determine the encoder signal pulse count at which the line of symmetry thereof, the piston top dead center position, occurs. Initial ignition timing angle is then set relative to the encoder signal pulse count corresponding to the piston top dead center position.

11 Claims, 9 Drawing Figures

E = ENERGY OF WAVEFORM
C = MEASURE OF CORRELATION
i = ENCODER PULSE INDEX

METHOD AND APPARATUS FOR ACCURATELY LOCATING PISTON TOP DEAD CENTER POSITION BY A MICROWAVE ENERGY TECHNIQUE

This application is a Continuation-in-Part of co-pending application Ser. No. 121,469, now abandoned, filed on Feb. 14, 1980 and assigned to the assignee of this invention.

This invention is directed to an improved method for accurately locating the top dead center position of the piston of a selected reference cylinder of an internal combustion engine by a microwave energy technique.

Recently, considerable effort has been directed to internal combustion engine ignition spark timing systems that are capable of calculating an ignition spark crankshaft angle that approaches the ideal for a variety of engine operating parameters and ambient conditions. As all ignition crankshaft timing angles are referenced to the engine piston top dead center position, even the most sophisticated of the modern ignition timing systems are no more accurate than the accuracy of the location of piston top dead center. It has been found that the mechanical techniques heretofore employed for locating the piston top dead center position may be inaccurate within a range of as much as plus or minus five engine crankshaft degrees. This inaccuracy in locating piston top dead center completely nullifies the effect of even the most sophisticated ignition timing system. Therefore, a method for accurately locating piston top dead center within plus or minus one tenth of an engine crankshaft angle degree is desirable.

It is, therefore, an object of this invention to provide an improved method and apparatus for accurately locating piston top dead center of a selected reference cylinder of an internal combustion engine.

It is another object of this invention to provide an improved method and apparatus for accurately locating piston top dead center of a selected reference cylinder of an internal combustion engine by employing a microwave energy technique.

It is another object of this invention to provide an improved method and apparatus for accurately locating piston top dead center of a selected reference cylinder of an internal combustion engine by coupling a microwave signal into the combustion chamber of the selected reference cylinder while the engine crankshaft is rotating and processing the microwave signal waveform reflected from the combustion chamber while the piston thereof approaches, passes through and moves away from the top dead center position during the compression and power strokes to determine the line of symmetry of the reflected signal waveform that occurs at the piston top dead center position.

It is a further object of this invention to provide an improved method for accurately locating piston top dead center of a selected reference cylinder of an internal combustion engine by coupling a microwave signal into the combustion chamber of the selected reference signal while the engine crankshaft is rotating, detecting the microwave signal waveform reflected from the combustion chamber for a selected interval of engine crankshaft angle while the piston approaches, passes through and moves away from top dead center position during the compression and power strokes, converting the detected microwave signal waveform to a corresponding digital value for each of a plurality of engine crankshaft angles and storing or recording the digital values and determining the line of symmetry of the detected microwave signal waveform by finding the point at which the stored digital values on one side thereof are best correlated with the stored digital values on the other side thereof.

Still another object of this invention is to provide a method of locating piston top dead center of an engine by coupling a microwave signal into the combustion chamber of the engine while the engine crankshaft is rotating and substantially continuously detecting the microwave signal waveform reflected from the combustion chamber over a crankshaft angle spanning top dead center, digitizing such signal over the crankshaft angle and then processing such signal in an advantageous stepwise manner that sharply and effectively identifies top dead center despite the presence of unwanted signal variations.

Still another object of this invention is to provide a method of locating piston top dead center of an internal combustion engine by coupling a microwave signal into the combustion chamber of the engine while the engine crankshaft is rotating, detecting the microwave signal waveform reflected from the combustion chamber, recording simultaneous crankshaft positions and signal values for a succession of crankshaft positions over an angle of rotation of the crankshaft that extends between positions located prior to and after top dead center, selecting from the recorded data first and second windows of data that each represent predetermined crankshaft angles disposed at opposite sides of a crankshaft position that is centered relative to the windows, comparing the data contained in the windows to determine the degree of correspondence therebetween, and shifting the data windows and repeating the comparison and shifting until at least substantial correspondence exists between the data contained in the windows.

Another object of this invention is to provide improved apparatus for detecting the top dead center position of the piston of an internal combustion engine. In accordance with this aspect of the invention a pulse generating apparatus is driven by the engine which develops a series of position pulses in synchronism with piston movement with each position pulse occurring at a predetermined piston position. A source of microwave signals is provided which is coupled to the cylinder by a probe. The probe detects the reflected waveform and digitizing apparatus is provided for digitizing the reflected waveform. The digitized waveform is coupled to a memory and the memory is connected to processing apparatus that is effective to compare portions of the digitized waveform to identify portions of the waveform that are symmetrical about a position pulse. This position pulse is indicative of the top dead center position of the piston.

The top dead center detection method of this invention can effectively process reflected waveforms having many peaks and waveforms in which a plurality of peaks each respectively disposed on opposite sides of top dead center have substantially the same amplitude. The method is therefore versatile in application and is immune to variation in the shape of the reflected waveform that might occur during engine testing use due, for example, to drift in the frequency of the microwave signal that is supplied to the engine cylinder.

In accordance with this invention, the piston top dead center position of a selected reference cylinder of an internal combustion engine is accurately located by coupling a microwave signal into the combustion chamber of the selected reference cylinder while the engine crankshaft is rotating and processing the microwave signal waveform reflected from the combustion chamber while the piston thereof approaches, passes through and moves away from the top dead center position during the compression and power strokes to determine the line of symmetry of the reflected signal waveform at which the piston top dead center is located.

For a better understanding of the present invention, together with additional objects, advantages and features thereof, reference is made to the following description and accompanying drawings in which:

FIG. 1 sets forth in block form the hardware necessary for implementing the method of this invention;

Figure 1:
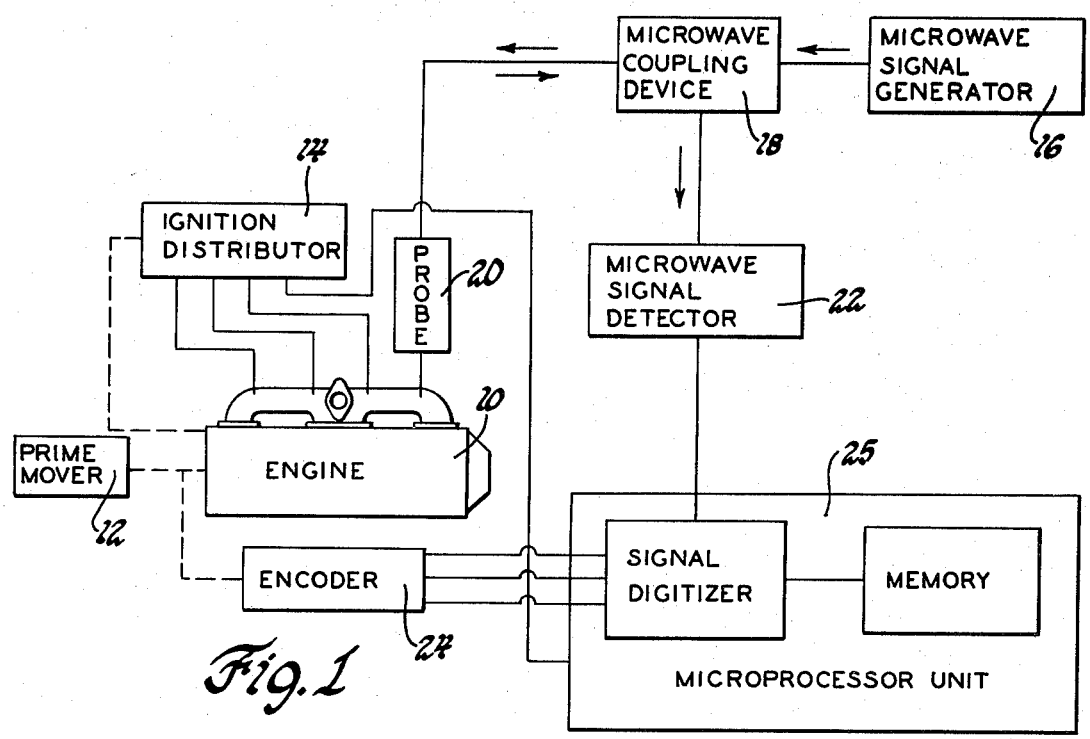

In FIG. 1 of the drawing, one example of the structure employed in practicing the method of this invention for accurately locating piston top dead center of a selected reference cylinder of an internal combustion engine by a microwave energy technique is set forth in block form. Although the technique of this invention may be used with both spark-ignited internal combustion engines and diesel engines, initially the technique will be explained with regard to a spark-ignited internal combustion engine 10 having the crankshaft thereof rotated by an external prime mover 12 such as an electric motor. Although engine 10 is illustrated as a four-cylinder engine, it is to be specifically understood that the technique of this invention may be used with engines both spark-ignited and diesel having more or less cylinders and may be employed while either a spark-ignited or a diesel engine is being operated by fuel combustion in the normal manner. While the crankshaft of engine 10 is being rotated by prime mover 12, the shaft of conventional ignition distributor 14 is also rotated by the engine and the ignition system is energized and operable, both in a manner well known in the automotive art. Prime mover 12 rotates the crankshaft of engine 10 at a convenient speed that may depend upon the engine characteristics. While the crankshaft of engine 10 is being rotated, a microwave signal of a substantially constant amplitude and frequency that is produced by a coventional microwave signal generator 16 is directed through a microwave coupling device 18, a microwave signal probe 20 and associated microwave frequency interconnections and is coupled into the combustion chamber of a selected engine 10 reference cylinder that functions as a variable length cavity as the piston contained therein is operated between the top dead center and bottom dead center positions and vice versa. The microwave signal reflected from the variable length cavity combustion chamber through the microwave probe 20 and microwave coupling device 18 is detected by a conventional microwave signal detector 22. In FIG. 1, the flow of microwave signal energy is denoted by and is in the direction of the arrows. The rotatable shaft of an encoder device 24 of a type that produces at least a series of output encoder signal pulses per shaft revolution is rotated at engine crankshaft speed by any convenient mechanical drive. Although not necessary for the practice of this invention, it may be convenient to employ an encoder device that also produces one output reference signal pulse per shaft revolution. Without intention or inference of a limitation thereto, this invention will be described in this specification with reference to an encoder device of this type. There are commercially available prime movers that have integrally contained encoder devices of this type that may be employed. Alternatively, a separate encoder device may be employed and driven through any convenient torsionally stiff mechanical linkage drive arrangement that is designed to approach zero backlash between the encoder shaft and the engine crankshaft. As the engine 10 ignition system is energized and operable and the shaft of ignition distributor 14 is rotated by engine 10, an ignition spark potential, hereinafter referred to as the "spark" signal, is directed through ignition distributor 14 to the output terminal thereof and the associated external spark plug lead corresponding to the selected engine 10 reference cylinder each time this cylinder is normally to be fired as is well known in the automotive art. It is to be specifically understood, however, that any other signal indicative of an engine timing event may be employed as this "spark" signal without departing from the spirit of the invention. The microwave signal waveform reflected from the combustion chamber of the selected engine 10 reference cylinder is detected by microwave signal detector 22 and this detected microwave signal waveform, the reference and encoder signal pulses produced by encoder device 24 and the "spark" signal are supplied as input signals to a conventional microprocessor unit 25 in which these input signals are employed in a process to be later explained in detail in this specification. As the engine 10, prime mover 12 and ignition distributor 14 are devices well known in the art, each has been illustrated in block form in FIG. 1. Similarly, as the microwave signal generator 16, the microwave coupling device 18, the microwave signal detector 22 and the encoder device 24 may be conventional devices of a type well known in the art and per se form no part of this invention, each has been illustrated in block form in FIG. 1. The microwave interconnections between the microwave signal generator, the microwave coupling device, the microwave signal probe and the microwave signal detector may be of any conventional design such as waveguides, flexible coaxial cable or semi-rigid coaxial cable.

Figure 2:
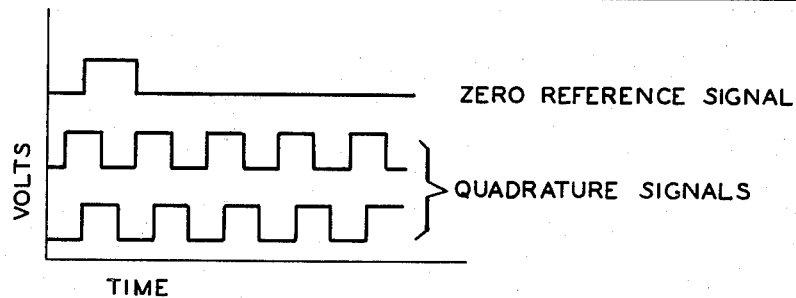
FIG. 2 is a set of curves indicating the output signal waveforms of an encoder device suitable for use with the method of this invention.
Figure 3:
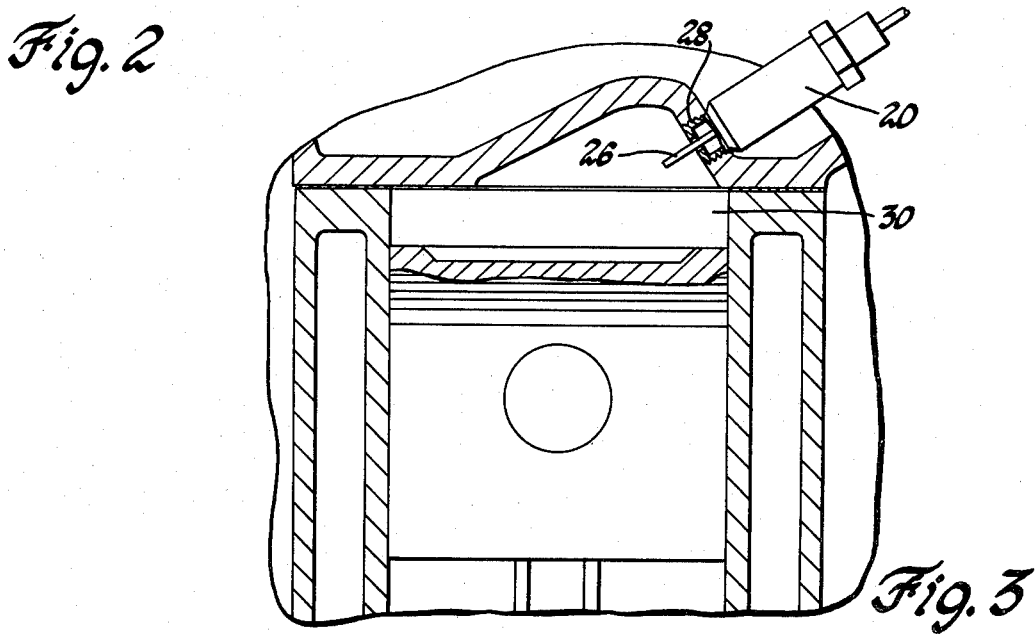
FIG. 3 illustrates the combustion chamber of a spark ignited internal combustion engine with a microwave energy probe mounted thereon through which a microwave signal may be coupled into the combustion chamber.

A sweep oscillator used in the CW mode of the type marketed by Hewlett-Packard of Palo Alto, Calif. under the designation Model 8690B may be employed as microwave signal generator 16; a microwave circulator marketed by Raytron Industries, Inc. under the designation Model 300049, series 23, may be employed as the microwave coupling device 18 and a back diode detector marketed by Omni Spectra of Merrimack, N.H. under the designation Model 20710 may be employed as the microwave signal detector. Alternatively, a directional coupler marketed by Narda Microwave Corp. of Plainview, N.Y. under the designation Model 4246-6 may be employed as the microwave coupling device. The microwave signal in an actual embodiment is coupled into the combustion chamber of the selected engine reference cylinder through a straight probe antenna that extends into the combustion chamber through the spark plug accommodating opening as illustrated in FIG. 3 where this probe is shown in partially broken section. In the actual embodiment, the interconnection between a microwave signal generator 16 and a microwave coupling device 18 is by a flexible coaxial cable, the interconnection between the microwave coupling device 18 and microwave signal probe 20 is through a semi-rigid coaxial cable and the interconnection between microwave coupling device 18, microwave signal detector 22 and microprocessor unit 25 is through flexible coaxial cable. It is to be specifically understood, however, that other satisfactory microwave interconnections may be employed without departing from the spirit of the invention. Also, in the actual embodiment, the encoder device 24 is a commercially available Trump-Ross encoder Model T-0720-D12M-5D5 marketed by Datametrics, Inc. of Wilmington, Mass. To obtain finer resolution, the 720 pulses per revolution output signal of this Trump-Ross encoder is processed by a well known phase-locked-loop technique to generate 7200 encoder signal pulses per shaft revolution. Another encoder device also suitable for use with this invention is a commercially available model 5V277 marketed by Baldwin Electronics, Inc. of Little Rock, Ark. This latter encoder device produces a single output reference pulse per revolution and two quadrature series of nine hundred encoder signal pulses per revolution, as shown by the curve of FIG. 2. As these output signals are extremely sharp square wave signals, microprocessor unit 25 may be programmed to be sensitive to both the rise and fall of each signal of each of these two series. Consequently, this encoder device effectively supplies a series of encoder signals at a frequency four times greater than the frequency of either of the series of output signals. For example, the Baldwin model 5V277 produces two series of 900 encoder signal pulses per revolution which to the microprocessor unit 25 is a series of 3600 encoder signal pulses. For purposes of this specification, it will be assumed that the encoder pulse generating system employed produces an encoder pulse output signal series of 7200 encoder signal pulses per engine crankshaft revolution. In the actual embodiment, an IBM model 370/168 computer was used to simulate the function of any number of commercially available microprocessor units that may be used to perform the desired function later explained in detail. This computer is commercially marketed by the International Business Machine Corporation of White Plains, N.Y. An MCS 6500 series microprocessor chip commercially marketed by MOS Technology, Incorporated of Morristown, Pa. is one example of a commercially available microprocessor chip that may be employed in microprocessor unit 25.

FIG. 3 of the drawing illustrates in partial cross section the microwave signal probe employed in the actual embodiment of this invention mounted upon an internal combustion engine by being threaded into the spark plug accommodating opening of the combustion chamber of the selected engine 10 reference cylinder with the antenna element 26 extending beyond housing 28 into combustion chamber 30. In the actual embodiment, a semi-rigid coaxial cable interconnects the microwave coupling device 18 and microwave signal probe 20 with the center conductor of the semi-rigid coaxial cable extending beyond housing 28 to serve as antenna element 26 and the outside conductor being connected to housing 28. It is to be specifically understood that alternate microwave interconnections between these devices may be employed without departing from the spirit of the invention.

Upon the initiation of rotation of the crankshaft of engine 10, the microwave energy signal is coupled into the combustion chamber 30 of the selected reference cylinder of engine 10 through microwave coupling device 18, microwave signal probe 20 and the suitable microwave energy interconnections. This microwave energy signal must be of a substantially constant amplitude and may be of any convenient constant frequency on the order of or higher than that of the cutoff frequency of the engine cylinder. In the actual embodiment, the frequency of the microwave energy signal is on the order of 10.3 Gigahertz. In a manner to be later explained in detail, the technique of this invention requires a change of reflected microwave power that has a fixed relationship to the position of the piston of the selected engine 10 reference cylinder, and, therefore, with engine crankshaft angle. As the level of microwave power reflected from a variable length cavity is determined by the length of the cavity for any given cavity configuration, the level of the microwave power reflected from the engine 10 reference cylinder is determined by piston position. As the piston of the engine 10 reference cylinder approaches, passes through and moves away from the top dead center position while the crankshaft of engine 10 is rotating, the length of the cavity defined by the engine cylinder head, cylinder liner and moving piston for any engine crankshaft angle before piston top dead center and the same corresponding angle after piston top dead center are substantially equal. As the reflected microwave power is dependent upon the length of this cavity for any given cavity configuration, the detected microwave signal waveform as a function of engine crankshaft angle is symmetrical about the piston top dead center position. Therefore, for any given cavity configuration, the line of symmetry of the detected microwave signal waveform is located at piston top dead center. This symmetry does not necessarily exist about the piston top dead center position between the exhaust and intake strokes of a four-stroke cycle engine because the opening of either the exhaust valve or the intake valve or both changes the cavity configuration. Therefore, the engine 10 reference cylinder is definitely a cavity of a given configuration only about the piston top dead center position between the compression and power strokes of a four stroke cycle engine during which both the intake and exhaust valves are closed. Therefore, the only portion of the reflected microwave signal waveform that is of any consequence for purposes of this invention is that which is symmetrical with respect to engine crankshaft angle about the piston top dead center position. It is this portion of the reflected microwave signal waveform that is processed in a manner now to be explained.

It is known that during the assembly of an internal combustion engine, the ignition distributor is so installed that the ignition spark potential, the "spark" signal, is directed thereby to the engine cylinder to be fired within plus or minus ten engine crankshaft degrees of the desired initial spark advance position. Therefore, that portion of the detected microwave signal waveform to be processed is initially referenced to the "spark" signal for the engine 10 reference cylinder. Although the duration in engine crankshaft degrees of that portion of the detected microwave signal waveform to be processed is discretionary within practical limits, it has been found that a duration on the order of 120 engine crankshaft degrees provides excellent results. Therefore, that portion of the detected microwave signal wave form that begins between 70 and 50 engine crankshaft degrees before piston top dead center and ends between 50 and 70 engine crankshaft degrees after piston top dead center may be processed. It is to be specifically understood that this engine crankshaft degree range is exemplary only as any range may be used so long as it includes piston position before, through and after the top dead center position. That is, the engine crankshaft angle before piston top dead center at which that portion of the microwave signal waveform to be processed starts may be any arbitrary but convenient engine crankshaft angle before piston top dead center and may extend for any arbitrary but sufficient duration of engine crankshaft degrees that insures that the symmetrical region of the detected microwave signal waveform is processed.

Upon the occurrence of the first output reference signal pulse of encoder device 24 subsequent to the initiation of engine crankshaft rotation, microprocessor unit 25 is programmed to begin counting the encoder device 24 output encoder signal pulses. Microprocessor unit 25 is programmed to determine the encoder signal pulse count of the first encoder signal pulse that occurs after an initial "spark" signal corresponding to the reference engine cylinder from ignition distributor 14. THe microprocessor unit 25 uses this encoder signal pulse count as a reference pulse count to determine the encoder signal pulse counts at which that portion of the detected microwave signal waveform to be processed begins and ends. These beginning and ending encoder signal pulse counts are established by adding appropriate numbers of encoder signal pulse counts to the encoder signal pulse count corresponding to the "spark" signal. Additionally, the microprocessor unit 25 is programmed to sample the detected microwave signal waveform reflected from the combustion chamber of the engine 10 reference cylinder for the interval of engine crankshaft angle during which the piston of this reference cylinder approaches, passes through and moves away from top dead center. In the actual embodiment, this interval is of the order of 120 engine crankshaft degrees. During and subsequent to the period of sampling of this detected microwave signal waveform, microprocessor unit 25 is programmed to process this waveform in a manner now to be explained.

While the detected microwave signal waveform is being sampled, the amplitude thereof is converted to a corresponding digital value for each of the encoder signal pulse counts in the signal digitizer section of microprocessor unit 25 and is stored in a corresponding addressable location in the memory section of microprocessor unit 25 in a manner well known in the computer art. A commercially available analog to digital converter circuit such as that commercially marketed by Analog Devices, Inc. of Norwood, Maine under the designation part No. AD-7574TD may be employed in the signal digitizer section of microprocessor unit 25. The microprocessor unit 25 processes these stored digital values to determine the encoder signal pulse count corresponding to the line of symmetry about which the stored digital values for the encoder signal pulse counts on one side thereof are best correlated with the corresponding stored digital values for the encoder signal pulse counts on the other side thereof in a manner now to be explained. In this regard, "correlate" means to establish a one to one correspondence of two sets or series of things.

It has been found that excellent results are obtained and the time required to process the digitized portion of the detected microwave signal waveform is significantly reduced by considering only those selected portions of the digitized portion of the detected waveform that occur during two selected engine crankshaft angle intervals separated by a selected crankshaft angle interval, expressed in encoder signal pulse counts. Hereinafter in this specification, the two selected crankshaft angle intervals expressed in encoder signal pulse counts will be referenced to as respective windows A and B. Although the width in encoder pulse counts of these windows A and B may be any convenient number of encoder signal pulse counts and the separating space may be any convenient number of encoder signal pulse counts, for purposes of this specification and without intention or inference of limitation thereto, it will be assumed that each of the windows A and B and the space therebetween has a width of 150 encoder signal pulse counts. Therefore, engine speed or a change of engine speed is immaterial.

Briefly, as an example, one way to process the selected portions of the reflected microwave signal waveform, microprocessor unit 25 may be programmed to select an encoder signal pulse count that is known to occur at an engine crankshaft angle before piston top dead center and, thereafter, for each and every encoder signal pulse count of windows A and B to:

(1) Retrieve the stored digital values for an encoder signal pulse count a predetermined number of encoder signal pulse counts on one side of the selected encoder signal pulse count and the stored digital value for the encoder signal pulse count the same number of encoder signal pulse counts on the other side of the selected encoder signal pulse count;

(2) Multiply these two retrieved digital values by each other and to square each of these two retrieved digital values;

(3) Add the product of the multiplication step to the product of the next previous multiplication step that initially has a zero value and to add the sum of the squares of the retrieved digital values to the next previous sum of the squares of the retrieved digital values that initially has a zero value and, at the conclusion of this portion of the program when these steps 1, 2 and 3 have been completed for a selected number of encoder signal pulse counts of the windows: to (4) Divide the product of the aggregate sum of the multiplied retrieved digital values multiplied by two by the aggregate sum of the squares of the retrieved digital values to obtain the normalized correlation value. A new encoder signal pulse count is selected from the next previous selected encoder signal pulse count by adding an index pulse count and this program is repeated until the quotient of the final step is equal to or substantially equal to unity.

Figure 4:
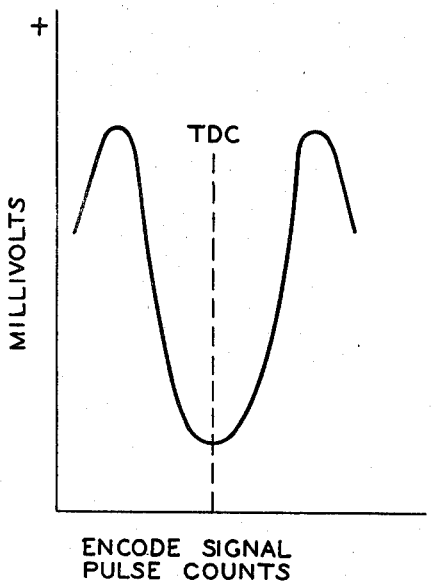
FIG. 4 is a curve of a typical waveform of the microwave energy reflected from the combustion chamber as the piston approaches, passes through and moves away from the top dead center position.

In FIG. 4 of the drawing, an actual waveform of the detected microwave signal that is generated while the piston of the engine cylinder to which the microwave energy is coupled approaches, passes through and moves away from the top dead center position is illustrated by a curve in which the detected microwave signal value in millivolts is plotted against encoder signal pulse counts. As microwave signal detector 22 functions substantially as a square law detector, the output signal is essentially proportional to input power. Therefore, essentially power, not amplitude, is detected. This waveform was detected from the microwave signal reflected from the reference cylinder of a 267 cubic inch (4.38 liter), iron block, spark-ignition V-8 engine having a stroke of 3.48 inches and a bore of 3.50 inches while the crankshaft was rotating at 515 RPM. The microwave signal coupled to the reference cylinder combustion chamber was 10.3 Gigahertz. For purposes of this specification and without intention or inference of a limitation thereto, it will be assumed that encoder device 24 produces 7200 encoder signal pulse counts per revolution, that the first output reference signal pulse of encoder device 24 occurs at seventy engine crankshaft degrees before piston top dead center, that the "spark" signal occurs at five engine crankshaft degrees before piston top dead center and that that portion of the detected microwave signal waveform to be processed begins sixty engine crankshaft degrees before the "spark" signal and extends over an engine crankshaft interval of 120 engine crankshaft degrees. Therefore, the encoder signal pulse count relative to the reference signal pulse at which that portion of the detected waveform to be processed begins is 100 and the encoder signal pulse count relative to the reference signal pulse at which this waveform ends is 120 engine crankshaft degrees later or encoder signal pulse count 2500. As the "spark" signal occurs at five engine crankshaft degrees before piston top dead center and the reference signal pulse occurs at seventy engine crankshaft degrees before piston top dead center, the "spark" signal occurs substantially at encoder signal pulse count 1300 (1400−100). As that portion of the detected microwave signal waveform to be processed is assumed to begin sixty engine crankshaft degrees before the "spark" signal, that portion of the detected microwave signal waveform to be processed begins at sixty five engine crankshaft degrees before top dead center that is the same as 300 engine crankshaft degrees after the "spark" signal. Therefore, by adding 6000 encoder signal pulse counts (300×20 encoder signal pulse counts per engine crankshaft degree) to the encoder signal pulse count of 1300 at which the "spark" signal substantially occurs, the encoder signal pulse count at which that portion of the detected microwave signal waveform to be processed begins is encoder signal pulse count 100 (1300+6000−7200 as there are only 7200 encoder signal pulse counts per revolution). As that portion of the detected microwave signal waveform to be processed is to extend over an engine crankshaft interval of 120 engine crankshaft degrees and begins sixty engine crankshaft degrees before the "spark" signal, the encoder signal pulse count at which that portion of the detected microwave signal waveform to be processed ends at encoder signal pulse count 2500 (1300+1200). Windows A and B, therefore, should be so selected that the first encoder signal pulse count of window A is no earlier than the encoder signal pulse count at which the selected portion of the microwave signal waveform to be processed begins.

As window width and window spacing are 150 encoder signal pulse counts each, the earliest encoder signal pulse count that microprocessor unit 25 can select is 325 (100+150+75). By selecting an encoder signal pulse count of 325, the first encoder signal pulse count of window A is 100, the encoder signal pulse count at which that portion of the detected microwave signal waveform to be processed begins. Therefore, it will be assumed that encoder signal pulse count 325 is the encoder signal pulse count initially selected by microprocessor unit 25 to begin the detected microwave signal waveform processing program.

Figure 6:
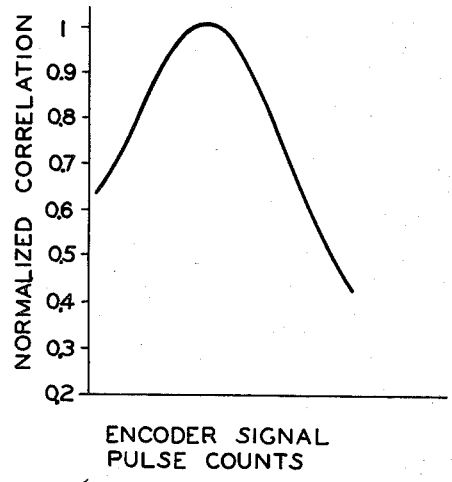
FIG. 6 is a curve useful in understanding the method of this invention.
Figure 5:
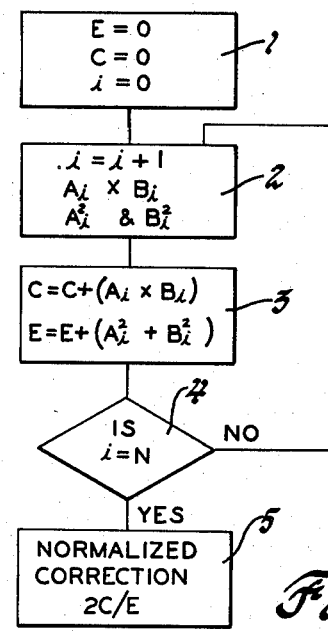
FIG. 5 is a flow chart of a computer program employed in the implementation of the method of this invention.

In FIG. 5 of the drawing, a flow diagram of the detected microwave signal waveform processing program is set forth. The stored digital values for an encoder signal pulse count a predetermined number of encoder signal pulse counts on one side of the selected encoder signal pulse count, count 325, and the stored digital value for the encoder signal pulse count the same number of encoder signal pulse counts on the other side of the selected encoder signal pulse count, count 325, are retrieved during the first step of the program. The stored digital value for encoder signal pulse count 100 that is 225 encoder signal pulse counts on one side of the selected encoder signal pulse count of 325, the width of window A in pulse counts plus one-half the space between windows A and B in pulse counts or 150 plus 75, and the stored digital value for encoder signal pulse count 550 that is 225 encoder signal pulse counts on the other side of the selected encoder signal pulse count of 325, the width of window B plus one-half the space between windows A and B in pulse counts or 150 plus 75, are the first values retrieved. At the beginning of the program as set forth in FIG. 5, at the initialization block 1, the quantity "E", the quantity "C" and the encoder pulse index "i" are all equal to zero. During block 2 of the program the replacement statement $i=i+1$ is completed by adding 1 to 0; the retrieved stored digital value for encoder signal pulse 100 ($A_1$) is multiplied by the retrieved stored digital value for encoder signal pulse 550 ($B_1$), $A_1 \times B_1$, and the retrieved stored digital values for encoder signal pulse counts 100 ($A_1$) and 550 ($B_1$) are each squared, $A_1^2$ and $B_1^2$. In block 3 of the program, the replacement statement $C = C + (A_i \times B_i)$ and the replacement statement $E = E + (A_i^2 B_i^2)$ are completed by adding the product $A_1 \times B_1$ to zero and by adding the sum of $A_1^2 + B_1^2$ to zero. In the decision block 4 of the program, it is determined whether "i" of the replacement statement of block 2 is equal to "N" where "N" equals the number of encoder signal pulse counts to be selected from each of windows A and B. As this is the first encoder signal pulse count processed, this answer is "no". Consequently, microprocessor unit 25 is programmed to revert to block number 2 where the replacement statement $i = i + 1$ is completed. As "i" now equals 1, this replacement statement is completed by adding 1 to 1, the stored digital values for encoder signal pulse counts 101 and 549 are retrieved and multiplied by each other and each is separately squared in block number 2. In block 3 of the program, the replacement statement $C = C + (A_i \times B_i)$ and the replacement statement $E = E + (A_i^2 + B_i^2)$ are completed by adding the product $A_2 \times B_2$ to the previous value for "C" and the sum $A_2^2 + B_2^2$ to the previous value for "E". In the decision block 4 of the program, it is determined whether "i" of the replacement statement of block 2 is equal to "N". If the answer is no, microprocessor unit 25 is programmed to again go through the procedure hereinabove set forth for blocks 2, 3 and 4 until the value of "i" of decision block 4 equals "N". It will be appreciated that the block 3 operates to sum the products $A_i \times B_i$ for "N" steps and operates to sum the function $A_i^2 + B_i^2$ for "N" steps and these separate summations are contained in separate registers. Therefore, one register will contain the sum of all of the individual $A_i \times B_i$ calculations and the other register will contain the sum of all of the individual $A_i^2 + B_i^2$ calculations. When the value of "i" is equal to "N" in block 4, the program steps to the final block 5 in which the product of the aggregate sum of the multiplied retrieved digital values, the value "C" in block 3, multiplied by two is divided by the aggregate sum of the squared retrieved digital values, the value "E" in block 3. If this quotient, the normalized correlation value, is not equal to or substantially equal to unity, the microprocessor unit 25 is programmed to select another encoder signal pulse count on either side of the initially selected encoder signal pulse count as desired. For example, should the quotient of block 5, the normalized correlation value, be not equal to or substantially equal to unity, the microprocessor unit 25 will select another encoder signal pulse count such as 326 and again perform the program hereinabove described. For this run of the program, the stored digital pulse values for encoder signal pulse count 101 and encoder signal pulse count 551 are initially retrieved and the previously described program is repeated. It will be evident that the shift from pulse count 325 to pulse count 326 and the shift from pulse counts 100 to 101 and from 550 to 551 corresponds to a simultaneous shifting of the windows A and B by one pulse count. The crankshaft angle represented by the width of the windows remains constant but new data is now contained in the windows due to the shifting of the windows. Therefore, it can be seen that as long as the data contained in windows A and B is not substantially identical or correlated the windows A and B are continuously shifted during each run of the computer until a window position is obtained wherein the data in windows A and B are in substantial correspondence. Should the quotient, the normalized correlation value, of block 5 at the conclusion of this second run of the program again not be equal to or substantially equal to unity, microprocessor unit 25 is programmed to select another encoder signal pulse count, retrieve the stored digital values for the encoder signal pulse counts the same number of pulse counts on each side of the newly selected encoder signal pulse count and repeat program as hereinabove set forth. This process continues until the quotient of box 5, the normalized correlation value, is equal to or substantially equal to unity. This means that the stored digital value for each encoder signal pulse on one side of the selected encoder signal pulse count is substantially equal to the stored digital value for each encoder signal pulse count the same number of counts on the other side of the selected encoder signal pulse count. This is evident by examination of the replacement statements of FIG. 5. If $A_i$ and $B_i$ are equal for the respective encoder signal pulse counts on one side and on the other side of the selected encoder signal pulse count, the product of these stored digital values is the same as the square of each of these stored digital values. Therefore, by multiplying the aggregate sum of the products of the stored digital values by two and by dividing this product by the aggregate sum of the squares of the stored digital values, the quotient is equal to or substantially equal to unity. This means that the line of symmetry of the detected microwave signal waveform is at the selected encoder signal pulse count at which the quotient of block 5 is equal to or substantially equal to unity, which is the encoder signal pulse count corresponding to piston top dead center. FIG. 6 of the drawing is a curve of normalized correlation or correspondence values of block 5, plotted against selected encoder signal pulse counts over a range of 140 encoder signal pulse counts. It may be noted that the normalized correlation values of FIG. 6 increase toward unity, reach unity and decrease from unity as the selected encoder signal pulse count increases. With regard to FIG. 6, microprocessor unit 25 is programmed in such a manner that with an increase of successive normalized correlation values, towards unity with each successive run of the program, the selected encoder signal pulse count is moved in the same direction. Upon the occurrence of a normalized correlation value equal to or substantially equal to unity, microprocessor unit 25 is programmed to recognize the selected encoder signal pulse count and to terminate the correlation program hereinabove described with reference to FIG. 5. This selected encoder signal pulse count identifies the line of symmetry of the detected microwave signal waveform and, consequently, corresponds to piston top dead center.

The successive retrievals of a stored digital value for an encoder signal pulse count on one side of the selected encoder signal pulse count and a stored digital value for an encoder signal pulse count the same number of encoder signal pulse counts on the other side of the selected encoder signal pulse count has the effect of folding the detected microwave signal waveform back upon itself about the selected encoder signal pulse count.

Figure 7:
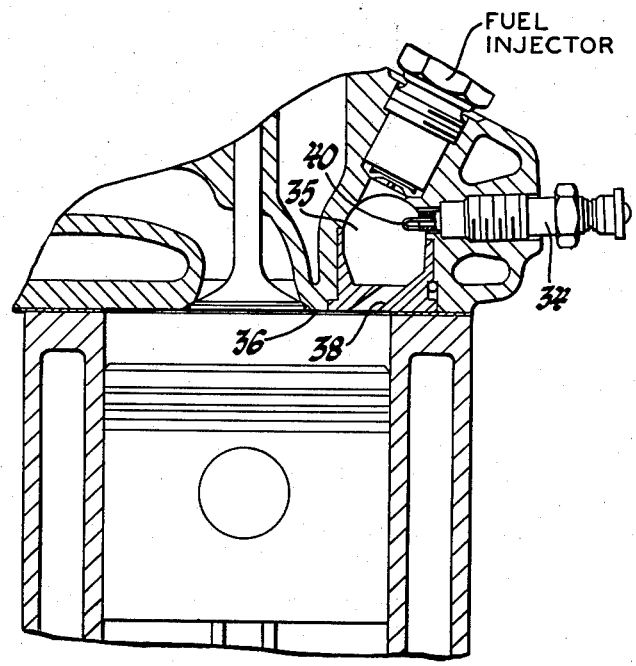
FIG. 7 illustrates the combustion chamber of a diesel engine with a microwave energy probe mounted thereon through which a microwave signal may be coupled into the combustion chamber.

The principles of operation of the technique of this invention are essentially identical for spark-ignition and diesel engines. However, the complex geometry inherent in divided-chamber diesel engines require additional consideration to be given to the frequency of the microwave energy signal. These additional considerations are:

1. For the divided-chamber diesel engine, FIG. 7, the microwave signal probe 34 is inserted through a glow plug accommodating opening with the loop antenna element 40 extending into the spherical prechamber cavity 35 of FIG. 7 that is a partial cross section through a typical indirect-injection divided chamber diesel engine (a Ricardo swirl chamber is shown). The spherical prechamber cavity 35 and the main combustion chamber 36 are interconnected through a narrow passageway 38. The nature of this divided chamber geometry results in a limited range of frequencies for which good microwave coupling exists between the prechamber cavity 35 and main combustion chamber 36. By way of contrast and as hereinabove described, in a spark-ignition engine the microwave signal probe can be inserted through the spark plug accommodating opening to provide direct coupling to the combustion chamber. With open-chamber diesel engines, suitable provision must be made for coupling the microwave energy signal into the combustion chamber through a microwave signal probe.

2. As it acts as a waveguide, the connecting passageway 38 will not transmit microwave signals of a frequency below the cutoff value $f_c$. This frequency is on an order of the value as expressed by the formula:

$$f_c = 150/L_{max} \ (GH_z)$$

where "$L_{max}$" is the maximum cross-sectional dimension of the passageway in millimeters. The minimum microwave frequency for a typical "$L_{max}$" value of ten millimeters, therefore, is on the order of 15 GH$_z$.

With a diesel engine, an electrical signal pulse corresponding to any repeatable signal associated with the combustion event such as injection line pulse, injector needle lift or prechamber inflammation that may be readily converted to an electrical signal pulse may be substituted for the "spark" signal pulse. In this regard, with both spark-ignition and diesel engines any electrical signal associated with a combustion event may be used for the "spark" signal.

After the encoder signal pulse count corresponding to piston top dead center is determined, the ignition distributor of a spark-ignition engine or the fuel injection timing of a diesel engine may be adjusted relative to this count to provide any desired initial timing. Further, as will be apparent to those skilled in the art, once the encoder signal pulse count corresponding to piston top dead center has been determined, this information may be used to establish piston top dead center marking on the engine as is well known in the automotive art. That is, the engine crankshaft may be rotated to the encoder signal pulse count corresponding to piston top dead center and the engine suitably marked.

In this specification, a specific correlation technique has been described in detail; straight and loop antenna elements have been shown and the technique of the invention has been described with regard to one reference signal pulse per engine crankshaft revolution. It is to be specifically understood that any other technique, correlation or otherwise, that is capable of identifying the line of symmetry of the detected microwave signal waveform and any coupling means for coupling the microwave energy into the combustion chamber may be employed without departing from the spirit of the invention. The single reference signal pulse per engine crankshaft revolution is not absolutely necessary as the function and purpose of this reference pulse can be served by any one of the encoder signal pulse counts. That is, the encoder signal pulse count corresponding to piston top dead center may be determined relative to any one of the encoder signal pulse counts as selected.

With further reference to the waveform depicted in FIG. 4, the vertical line identified as TDC denotes the point on the waveform at which the piston is at its top dead center position. It can be seen that portions of the curve or waveform to the left and right of the top dead center line are symmetrical. The abscissa, of FIG. 4, represents piston position and encoder counts and the ordinate the magnitude of the detected waveform for a given piston position. The curve of FIG. 4 represents the output of the diode-detector 22. The portion of the curve to the left of the TDC line corresponds to movement of the piston during the compression stroke of a four cycle engine and the portion of the curve to the right of the TDC line corresponds to the power stroke of the piston of the engine.

It will be evident that when the FIG. 4 waveform is digitized as a function of piston position (at each encoder pulse) a series of digital values will be developed each of which represents the magnitude of a small portion of the FIG. 4 curve corresponding to the pulse width of an encoder pulse. Since the curve of FIG. 4 is symmetrical about the top dead center position of the piston the magnitudes of the digital values corresponding to a given pair of encoder pulses will be substantially equal when the given pair of encoder pulses are respectively located at equal distances before and after the top dead center line shown on FIG. 4. Accordingly, by comparing or correlating the magnitude information (digital value) corresponding to selected pairs of respective encoder pulses it is possible to identify which encoder pulse occurred at the TDC line illustrated in FIG. 4. As pointed out, a large number of encoder pulses (150 for each window A and B) are sampled and compared and this procedure continues until a correlation is achieved. By the use of a relatively large number of encoder pulses good correspondence is achieved between the curve of FIG. 4 and the digital representation of the curve over the window periods A and B.

Figure 8:
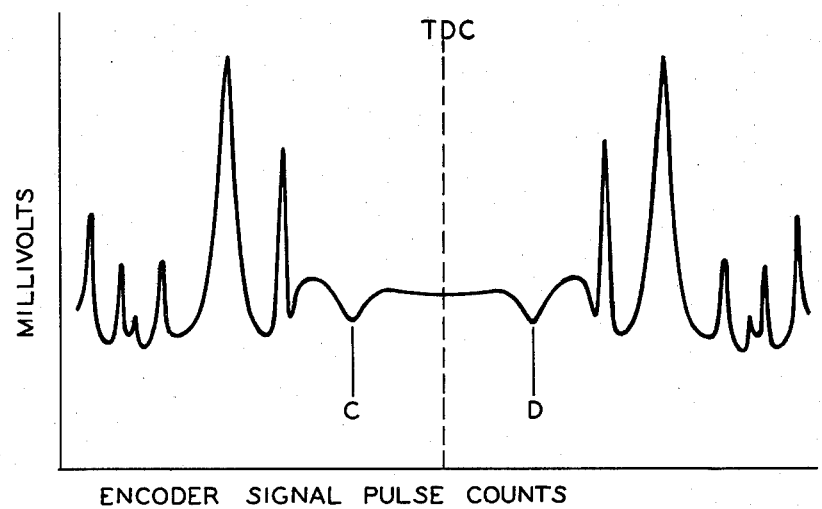
FIGS. 8 and 9 are curves of additional waveforms reflected from combustion chambers of engines.

The shape of the reflected waveform depends on the internal geometry of the cavity defined by the piston and cylinder of the particular engine being tested and the input frequency of the microwave signal and will take various shapes depending upon the particular engine being tested and the input frequency. This is illustrated by a comparison of the curves of FIGS. 4, 8 and 9. As previously described, the FIG. 4 curve relates to a 267 cubic inch (4.38 liter) spark-ignited V-8 engine with an input frequency of about 10.3 Gigahertz. The FIG. 8 waveform represents a Chevrolet spark-ignited 305 V-8 engine with an input frequency of 10.525 Gigahertz. The FIG. 9 waveform represents a spark-ignited Chevrolet 350 cubic inch V-8 light-duty truck engine with an input frequency of 10.30 Gigahertz. In FIG. 4 approximately 27 crankshaft degrees of the waveform have been illustrated. FIG. 8 represents approximately 50 degrees of crankshaft rotation and FIG. 9 about 36 degrees of crankshaft rotation. In each figure TDC is indicated by the dotted line and the curves represent conditions where the engine is being motored, that is, being driven by the prime mover 12.

Figure 9:
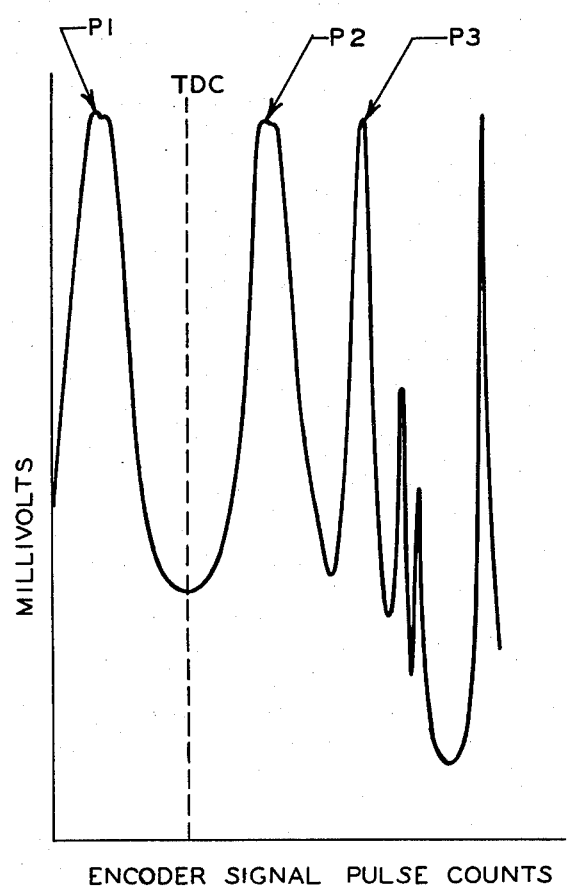

From an inspection of the waveforms of FIGS. 8 and 9 it is apparent that in order to detect top dead center from these waveforms it is necessary to use a detection scheme that is capable of accommodating multi-peaked waveforms and also waveforms where a plurality of peaks, for example P1, P2 and P3, in FIG. 9, have substantially the same amplitude. Since the waveform is multi-peaked and since it is possible to generate a plurality of peaks of the same amplitude on opposite sides of top dead center it is difficult to identify the symmetrical top dead center point of the waveform by arrangements that might attempt to identify or pick out a particular single peak and detect it by a peak detector. In contrast to such an arrangement the present invention utilizes the windows A and B to capture transitions in the waveform and moves these windows along the waveform until the data passing through the windows are substantially mirror images. The width of the windows may be such that the windows may contain a plurality of peaks but this does not affect the accuracy of the window comparison method of this invention.

Since the top dead center detection method of this invention can effectively process a wide variety of reflected waveform configurations the method is versatile in application and is immune to variation in the shape of the reflected waveform that might occur during engine testing use due, for example, to a drift in the frequency of the microwave signal that is supplied to the engine cylinder.

The time required to process the data contained in the windows depends on the span or width of the windows, that is as window span is decreased processing time is also decreased. The window span on the other hand must be wide enough to encompass significant waveform information. Further, to maximize accuracy the data windows should be arranged so that the windows do not simultaneously contain data to be compared that represents a portion of the reflected waveform that has little amplitude variation or, in other words, a flat portion of the waveform. Thus, if a portion of the reflected waveform has very little amplitude variation and the data windows simultaneously contain data representing such a flat waveform a comparison of the data contained in the data windows could result in a less accurate determination of the point of symmetry of the waveform. Obviously, if the data windows were to simultaneously detect a constant function the method of this invention would indicate symmetry at that particular position of the data windows.

It can be seen, from FIG. 8, that the portion of the waveform between points C and D, located equidistantly about top dead center, has little amplitude variation. The span C-D is approximately 10 crankshaft degrees and to prevent the data windows A and B from simultaneously processing portions of this flat waveform the data windows A and B should be spaced from each other by at least 10 crankshaft degrees. The flattening out of the waveform about top dead center is due to the fact that motion of the piston is attenuated over crankshaft angles near top dead center.

In the case of center diesel engines, for example the Oldsmobile 1980 5.7 liter diesel engine, the flat portion of the waveform that is centered about top dead center may extend for a span of approximately 40 crankshaft degrees, that is 20 degrees on either side of top dead center. Therefore, in determining the space between the windows A and B, for this type of engine, the space can be made on the order of 40 engine crankshaft degrees. The spacing of the data windows A and B has an additional advantage. Thus, it has been observed that in some motoring tests of a spark-ignited engine the reflected waveform may exhibit a slight asymmetry over a range centered about top dead center which is believed to be due to side-to-side motion of the piston in the vicinity of top dead center. To prevent this from adversely affecting the detection of top dead center by the method of this invention, the windows can be spaced sufficiently so as not to be processing asymmetrical waveform data when the windows are centered about top dead center.

In summary, the data windows A and B should be wide enough to accommodate significant varying waveform information, should be as small as possible to minimize processing time and for maximum accuracy should be separated sufficiently that they do not simultaneously detect the portion of the waveform that occurs near top dead center that has little amplitude variation. Further, the data windows can be spaced to ignore any asymmetrical waveform portion near top dead center if it exists. In general, to ensure maximum accuracy and to accommodate the various waveform shapes that may occur, the two windows may be approximately 5 crankshaft degrees wide with a separation or space of 20 degrees for a spark-ignited engine and the data windows may be 5 degrees wide with a separation of 40 degrees for a diesel engine. Thus, when the windows have been shifted to a position centered about top dead center, and when using the just described spacings, the data sampled by each window is restricted to an area that does not extend away from top dead center in either direction by more than about 25 crankshaft degrees for the diesel engine nor more than 15 degrees for a spark-ignited engine. This ensures that any asymmetric waveform portions that might occur outboard of top dead center by more than 25 degrees due for example to any piston ring shifting during the compression and power strokes, will be ignored in either case.

As mentioned, the method and apparatus of this invention is applicable to test procedures wherein the engine is driven by a prime mover (motored) or to hot testing of an engine where the engine is running under its own power, that is where a combustible mixture is supplied to the engine cylinder which is fired.

The method of locating top dead center, in accordance with this invention, is substantially immune to any variation in engine speed that might occur while top dead center is being located. Thus, the position pulses developed by encoder 24 are dependent upon crankshaft and piston position and occur at the same intervals in terms of crankshaft angular rotation regardless of engine speed. Further, the reflected microwave signal is a function of crankshaft and piston position and represents such position regardless of any variation in engine speed that might occur when top dead center is being located.

The embodiments of the invention in which an exclusive property or privilege is claimed are defined as follows:

1. A method of accurately locating the top dead center position of the piston of a selected reference cylinder of an internal combustion engine comprising the steps of:

coupling a microwave energy signal of a substantially constant amplitude and frequency into the combustion chamber of said selected reference cylinder while the crankshaft of said engine is rotating;

producing a series of encoder signal pulse counts for each revolution of said engine crankshaft;

detecting the microwave signal waveform reflected from said combustion chamber for a selected interval of engine crankshaft angle during which the piston of said selected reference cylinder approaches, passes through and moves away from top dead center position to produce a microwave signal waveform having an amplitude that is a function of piston position and that is symmetrical about piston top dead center;

converting said detected microwave signal waveform to a corresponding digital value for each of said encoder signal pulse counts and storing said digital values; and determining the said encoder signal pulse count about which said stored digital values for said encoder signal pulse counts on one side thereof are best correlated with the said stored digital values for said encoder signal pulse counts on the other side thereof.

2. A method of accurately locating the top dead center position of the piston of a selected reference cylinder of an internal combustion engine comprising the steps of:
- coupling a microwave energy signal of a substantially constant amplitude and frequency into the combustion chamber of said selected reference cylinder while the crankshaft of said engine is rotating;
- producing a series of encoder signal pulse counts for each revolution of said engine crankshaft;
- detecting the microwave signal waveform reflected from said combustion chamber for a selected interval of engine crankshaft angle during which the piston of said selected reference cylinder approaches, passes through and moves away from top dead center position while the cavity defined by said cylinder and said piston remains of the same configuration to produce a microwave signal waveform having an amplitude that is a function of piston position and is symmetrical about piston top dead center;
- converting said detected microwave signal waveform to a corresponding digital value for each of said encoder signal pulse counts and storing said digital values; and
- determining from said stored digital values the said encoder signal pulse count about which said stored digital values for said encoder signal pulse counts on one side thereof are best correlated with the said stored digital values for said encoder signal pulse counts on the other side thereof.

3. A method of accurately locating the top dead center position of the piston of a selected reference cylinder of an internal combustion engine comprising the steps of:
- coupling a microwave energy signal of a substantially constant amplitude and frequency into the combustion chamber of said selected reference cylinder while the crankshaft of said engine is rotating;
- producing a series of encoder signal pulse counts for each revolution of said engine crankshaft;
- detecting the microwave signal waveform reflected from said combustion chamber for a selected interval of engine crankshaft angle during which the piston of said selected reference cylinder approaches, passes through and moves away from top dead center position to produce a microwave signal waveform having an amplitude that is a function of piston position and that is symmetrical about piston top dead center;
- converting said detected microwave signal waveform to a corresponding digital value for each of said encoder signal pulse counts and storing said digital values; and
- determining from said stored digital values the said encoder signal pulse count that corresponds to piston top dead center by processing the said stored digital values for at least two groups of encoder signal pulse counts until the said stored digital values of one said group are substantially correlated with the corresponding said stored digital values of another said group.

4. A method of accurately locating the top dead center position of the piston of a selected reference cylinder of an internal combustion engine comprising the steps of:
- coupling a microwave energy signal of a substantially constant amplitude and frequency into the combustion chamber of said selected reference cylinder while the crankshaft of said engine is rotating;
- producing a series of encoder signal pulse counts for each revolution of said engine crankshaft;
- detecting the microwave signal waveform reflected from said combustion chamber for a selected interval of engine crankshaft angle during which the piston of said selected reference cylinder approaches, passes through and moves away from top dead center position to produce a microwave signal waveform having an amplitude that is a function of piston position and that is symmetrical about piston top dead center;
- converting said detected microwave signal waveform to a corresponding digital value for each of said encoder signal pulse counts and storing said digital values; and
- selecting a first and a second group of said encoder signal pulse counts;
- processing the said stored digital values for said encoder signal pulse counts of said first group and the corresponding said stored digital values for said encoder signal pulse counts of said second group in a manner to determine whether a substantial correlation exists between the corresponding said stored digital values for respective encoder signal pulse counts of said first and second groups;
- selecting differential first and second groups of said encoder signal pulse counts when correlation does not exist;
- repeating said processing with different first and second groups of said encoder signal pulse counts until a substantial correlation does exist between the said stored digital values for said encoder signal pulse counts of said first group and the corresponding said stored digital values of said second group; and
- identifying the said encoder signal pulse count located substantially midway between said encoder signal pulse counts of said first and second groups that corresponds to piston top dead center.

5. A method of accurately locating the top dead center position of the piston of a selected reference cylinder of an internal combustion engine comprising the steps of:
- coupling a microwave energy signal of a substantially constant amplitude and frequency into the combustion chamber of said selected reference cylinder while the crankshaft of said engine is rotating;
- producing an electrical signal that is associated with a combustion event;
- producing a series of encoder signal pulse counts for each revolution of said engine crankshaft;
- detecting the microwave signal waveform reflected from said combustion chamber for a selected interval of engine crankshaft angle during which the piston of said selected reference cylinder approaches, passes through and moves away from top dead center position to produce a microwave signal waveform having an amplitude that is a function of piston position and that is symmetrical about piston top dead center;
- converting said detected microwave signal waveform to a corresponding digital value for each of said encoder signal pulse counts and storing said digital values;
- sensing said electrical signal that is associated with a combustion event and determining the encoder signal pulse count at which a selected portion of said detected microwave signal waveform to be processed begins and ends by adding appropriate numbers of encoder signal pulse counts to the said encoder signal pulse count corresponding to said electrical signal as determined by the engine crankshaft angle before the occurrence of the signal at which the said selected portion of said detected microwave signal waveform to be processed is to begin and the engine crankshaft interval in engine crankshaft degrees over which it is to extend;

selecting first and second groups of said encoder signal pulses of the same selected number of said encoder signal pulse counts separated from each other by a selected number of said encoder signal pulse counts with the first said encoder signal pulse count of said first group being no earlier than the said encoder signal pulse count at which said selected portion of said detected microwave signal waveform to be processed begins;

processing the said stored digital values for said encoder signal pulse counts of said first group and the corresponding said stored digital values for said encoder signal pulse counts of said second group in a manner to determine whether a substantial correlation between the corresponding said stored digital values for respective encoder signal pulse counts of said first and second groups;

selecting different first and second groups of said encoder signal pulse counts when correlation does not exist;

repeating said processing with different first and second groups of said encoder signal pulse counts until a substantial correlation does exist between the said stored digital values for said encoder signal pulse counts of said first group and the corresponding said stored digital values of said second group; and identifying the said encoder signal pulse count located substantially midway between said encoder signal pulse counts of said first and second groups that corresponds to piston top dead center.

6. A method of identifying top dead center position of a piston that is reciprocable within a cylinder of an internal combustion engine and connected to the crankshaft of the engine, comprising the steps of:

injecting a microwave signal into said cylinder while operating the piston;

sensing a microwave signal value developed within the cylinder during such operation, the frequency of the injected microwave signal being such that the amplitude of the sensed signal value varies with piston position and is substantially symmetrical about the top dead center position of the piston;

recording simultaneous crankshaft positions and signal values, respectively, for a succession of crankshaft positions the first of which is predictably prior to top dead center and the last of which is predictably after top dead center utilizing as crankshaft position information a series of signal pulses developed in synchronism with crankshaft rotation whereby the recorded information is not affected by changes in engine speed;

selecting from recorded signal values first and second spaced windows of signal values that each represent predetermined crankshaft angles that are disposed at opposite sides of a crankshaft position that is centered relative to the windows and comparing the signal values contained in the windows to determine the degree of correspondence therebetween; and shifting the windows and repeating the comparison and shifting until at least substantial correspondence exists between the signal values contained in the windows whereby a crankshaft position located midway said windows is indicative of the top dead center position of the piston.

7. The method of identifying top dead center position of a piston that is reciprocable within a cylinder of an internal combustion engine and connected to the crankshaft of the engine, comprising the steps of:

injecting microwave signals into said cylinder while operating the piston;

sensing a signal value within the cylinder during such operation;

recording simultaneous crankshaft positions and signal values, respectively for a succession of crankshaft positions the first of which is predictably prior to top dead center and the last of which is predictably after top dead center utilizing as crankshaft position information a series of signal pulses developed in synchronism with crankshaft rotation whereby the recorded information is not affected by changes in engine speed;

selecting from the recorded signal values first and second windows of signal values that are spaced by an amount representing a predetermined crankshaft angle with each window representing predetermined substantially equal crankshaft angles that are disposed at opposite sides of a crankshaft position that is centered relative to the windows and comparing a plurality of signal values contained in the windows to determine the degree of correspondence therebetween; and shifting the windows and repeating the comparison and shifting until at least substantial correspondence exists between the signal values contained in the windows whereby the centered crankshaft position indicates top dead center.

8. A method of identifying a crankshaft position signal pulse that occurs when the piston of an internal combustion engine attains a top dead center position, comprising the steps of: driving an electrical pulse generating apparatus by the engine which is operative to produce a series of consecutively occurring uniformly spaced electrical position pulses synchronized with crankshaft movement with each pulse occurring at a predetermined crankshaft position, injecting a microwave signal into the cylinder of the engine and detecting the reflected waveform while said piston moves at least between positions located prior to and subsequent to the top dead center position, the frequency of said microwave signal being such that the reflected waveform has an amplitude that is a function of piston position and is substantially symmetrical about top dead center;

recording a series of signal values corresponding respectively to a series of said position pulses the magnitude of which correspond to the amplitude of the reflected waveform when a given position pulse occured whereby the recorded information is not substantially affected by changes in engine speed;

selecting from the recorded signal values first and second spaced windows of signal values that each represent predetermined crankshaft angles and comparing the signal values contained in the windows to determine the degree of correspondence therebetween; and shifting the windows and repeating the comparison and shifting until at least substantial correspondence exists between the signal values contained in the windows whereby a crankshaft position located midway the windows is indicative of the position pulse that occurred when the piston was at its top dead center position.

9. In combination, an internal combustion engine having a crankshaft connected with a piston that is reciprocable within a cylinder of the engine as the crankshaft rotates:
   a microwave signal source;
   a probe connected to said source and effective to inject a microwave signal into said cylinder at a point above top dead center, the frequency of the signal being such that a microwave signal is developed in the cylinder the amplitude of which is a function of piston position and which is substantially symmetrical about piston top dead center;
   detector means coupled to said probe effective to detect said microwave signal;
   means mechanically connected to said crankshaft effective to develop a series of crankshaft position pulses representing predetermined substantially equally spaced crankshaft angles at least over a crankshaft angle that extends between positions located prior to and subsequent to top dead center;
   memory means responsive, respectively, to the event of each last-mentioned pulses and to the magnitude of said microwave signal detected by said detector means at such time and effective to record a series of numbers representing, sequentially, the successive values of the magnitude of the microwave signal for predetermined crankshaft position pulses; and
   means coupled to said memory means effective to compare the magnitude of pairs of recorded numbers at predetermined crankshaft angles before and after a movable reference crankshaft angle and operative to shift the movable reference angle until at least substantial correspondence exists between the magnitude of the pairs of numbers on opposite sides thereof, thereby identifying top dead center.

10. In combination, an internal combustion engine having a piston reciprocable within a cylinder of the engine, an electrical pulse generating apparatus driven by the engine operative to produce a series of consecutively occurring crankshaft position pulses synchronized with crankshaft movement with each pulse occurring at a predetermined crankshaft position;
   a microwave signal source;
   means connected to said source for injecting a microwave signal into the cylinder of the engine;
   means coupled to the cylinder for detecting the reflected waveform while said piston moves at least between positions located prior to and subsequent to the top dead center position, the frequency of said microwave signal being such that the reflected waveform has an amplitude that is a function of piston position and is substantially symmetrical about top dead center;
   means including memory means coupled to said detecting means and to said pulse generating means for recording a series of signal values corresponding to predetermined crankshaft position pulses the magnitude of which corresponds to the amplitude of the reflected waveform when a given position pulse occurs; and
   processor means connected to said memory means for selecting from the recorded signal values first and second windows of signal values that each represent predetermined crankshaft angles that are disposed at opposite sides of a crankshaft position that is centered relative to the windows and comparing the signal values contained in the windows to determine the degree of correspondence therebetween, said processor means operative to shift the windows and centered crankshaft position and repeating the comparison and shifting until at least substantial correspondence exists between the signal values contained in the windows whereby the centered crankshaft position indicates the crankshaft position pulse that occurred when the piston was at its top dead center position.

11. A method of identifying top dead center position of a piston that is reciprocable within a cylinder of an internal combustion engine and connected to the crankshaft of the engine while the engine is running and which is substantially immune to engine speed variation, comprising the steps of:
   injecting a microwave signal into said cylinder while the engine is running;
   sensing a microwave signal value developed within the cylinder during such operation, the frequency of the injected microwave signal being such that the amplitude of the sensed signal value varies with piston position and is substantially symmetrical about the top dead center position of the piston;
   recording simultaneous crankshaft positions and signal values, respectively, for a succession of crankshaft positions the first of which is predictably prior to top dead center and the last of which is predictably after top dead center utilizing as crankshaft position information a series of signal pulses developed in synchronism with crankshaft rotation whereby the recorded information is not affected by changes in engine speed;
   selecting from recorded signal values first and second windows of signal values that each represent predetermined crankshaft angles and comparing the signal values contained in the windows to determine the degree of correspondence therebetween; and
   shifting the windows and repeating the comparison and shifting until at least substantial correspondence indicative of signal value symmetry exists between the signal values contained in the windows whereby the recorded crankshaft position pulse located midway the windows indicates the top dead center position of the piston when the windows have been shifted to a position in which signal value symmetry occurs.

* * * * *